United States Patent [19]

Stach et al.

[11] 3,843,598
[45] Oct. 22, 1974

[54] FIRE RETARDANT POLYMERS CONTAINING HALOGENATED N-PHENYL BENZAMIDES

[75] Inventors: Leonard J. Stach, Riverside; Raymond W. Ingwalson, Arlington Heights, both of Ill.

[73] Assignee: Velsicol Chemical Corporation, Chicago, Ill.

[22] Filed: Dec. 3, 1973

[21] Appl. No.: 420,994

[52] U.S. Cl. .................. 260/45.75 R, 260/45.75 B, 260/45.9 NC
[51] Int. Cl. ..................... C08f 45/62, C08g 51/62
[58] Field of Search ............ 260/45.75 B, 45.9 NC, 260/45.75 R, 32.6 R, 32.6 A, 32.4, 558 D

[56] References Cited
UNITED STATES PATENTS 2,724,643  11/1955  Morris et al. ...................... 260/558
2,965,575  12/1960  Beaver et al. ...................... 260/558

Primary Examiner—V. P. Hoke
Attorney, Agent, or Firm—Robert J. Schwarz; Dietmar H. Olesch

[57] ABSTRACT

This invention discloses fire retardant polymeric compositions comprising a combustible polymer and a fire retarding amount of a compound of the formula

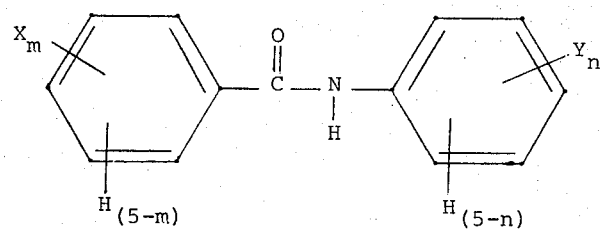

wherein X and Y are each selected from the group consisting of chlorine and bromine and $m$ and $n$ are each integers from 1 to 5.

8 Claims, No Drawings

FIRE RETARDANT POLYMERS CONTAINING HALOGENATED N-PHENYL BENZAMIDES

This invention relates to polymeric compositions which have been rendered fire retardant by the addition of certain halogenated N-phenylbenzamides.

Organic polymeric compositions find wide application in the manufacture of molded and extruded articles as well as in paints, films, coatings and miscellaneous products. Since the great majority of organic polymeric compositions are highly flammable it is desirable to render these fire retardant. It has now been found that certain halogenated N-phenylbenzamides possess the desirable property of rendering organic polymers fire retardant when incorporated therein.

Thus, an embodiment of the present invention resides in fire retardant polymeric compositions comprising a combustible polymer and a fire retardant amount of a compound of the formula

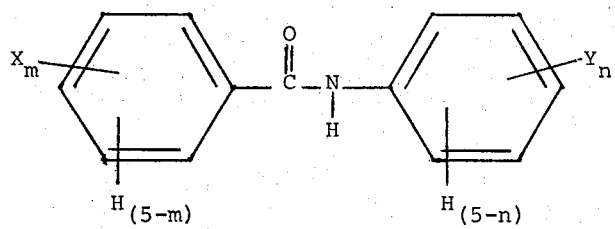

wherein X and Y are each selected from the group consisting of chlorine and bromine, and $m$ and $n$ are each integers from 1 to 5.

The benzamides of the present invention can be prepared by reacting a benzoyl chloride of the formula

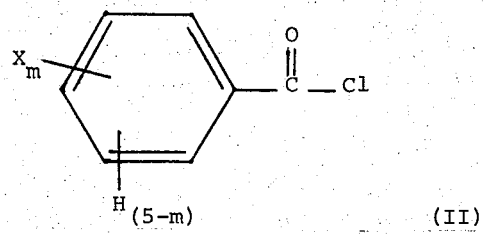

wherein X and $m$ are as heretofore described, with about an equimolar amount of an aniline of the formula

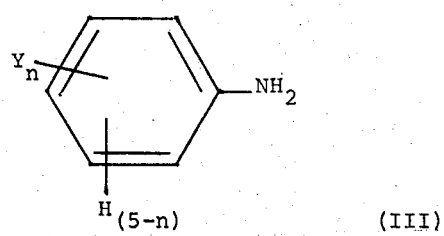

wherein Y and $n$ are as heretofore described. This reaction can be effected by combining the compounds of formulae II and III in an inert organic reaction medium in the presence of an acid acceptor such as a tertiary amine or alkali metal carbonate or bicarbonate. The reaction mixture can then be heated at reflux temperatures for a period of from about one-half to about 8 hours. After this time the desired product can be recovered by filtration or upon evaporation of the organic reaction medium and can be used as such or can be further purified by conventional techniques such as washing, recrystallizing and the like.

The preparation of the benzamides of this invention is more specifically illustrated in the following examples.

EXAMPLE 1

Preparation of N-(3,4-Dichlorophenyl)-2-bromobenzamide 3,4-Dichloroaniline (32.4 grams; 0.2 mole), triethylamine (20.2 grams) and toluene (150 ml) are charged into a 500 ml glass reaction flask equipped with a mechanical stirrer, thermometer and reflux condenser. The mixture is heated to reflux and 2-bromobenzoyl chloride (44.0 grams; 0.2 mole) dissolved in toluene (20 ml) is incrementally added, with stirring, to the mixture. After the addition is completed heating and stirring are continued for a period of about 4 hours. After this time the reaction mixture is filtered to recover the precipitated product formed. The precipitate is then washed with water and dried to yield the desired product N-(3,4-dichlorophenyl)-2-bromobenzamide.

EXAMPLE 2

Preparation of N-(2,4,6-Tribromophenyl)-2,5-dichlorobenzamide 2,4,6-Tribromoaniline (65.96 grams; 0.2 mole) and toluene (150 ml) are charged into a glass reaction vessel equipped with a mechanical stirrer, thermometer and reflux condenser. The mixture is heated at reflux and 2,5-dichlorobenzoyl chloride (92.5 percent 2,5-isomer; 44.0 grams; 0.21 mole) dissolved in toluene (20 ml) is incrementally added with stirring. After the addition is completed heating and stirring is continued for a period of 3½ hours to form a precipitate. The precipitate is recovered by filtration, and is washed with cold benzene. The remaining solid is then washed with 10 percent aqueous sodium carbonate and with water. The washed solid is then dried to yield the desired product N-(2,4,6-tribromophenyl)-2,5-dichlorobenzamide having a melting range of 217° to 223°C.

EXAMPLE 3

Preparation of N-(2,3,4,5-Tetrachlorophenyl)-3,5-dichlorobenzamide 2,3,4,5-Tetrachloroaniline (23.1 grams; 0.1 mole) and toluene (150 ml) are charged into a glass reaction vessel equipped with a mechanical stirrer, thermometer and reflux condenser. The mixture is heated at reflux and a solution of 3,5-dichlorobenzoyl chloride (22.0 grams; 0.11 mole) in toluene (30 ml) is incrementally added with stirring. After the addition is completed heating and stirring are continued for a period of about 3 hours. After this time the mixture is filtered to recover the precipitate formed. The precipitate is washed with water and is dried to yield the desired product N-(2,3,4,5-tetrachlorophenyl)-3,5-dichlorobenzamide.

EXAMPLE 4

Preparation of N-(2,4,6-Tribromophenyl)-4-bromobenzamide 2,4,6-Tribromoaniline (33 grams; 0.1 mole) and toluene (150 ml) are charged into a glass reaction vessel equipped with a mechanical stirrer, thermometer and reflux condenser. The mixture is heated at reflux and a solution of 4-bromobenzoyl chloride (22 grams; 0.1 mole) in toluene (30 ml) is incrementally added with stirring. After the addition is completed heating and stirring are continued for a period of about 4 hours. After this time the reaction mixture is filtered to recover the precipitated product which has formed. The precipitate is then washed with dilute aqueous sodium carbonate and with water and is then dried to yield the desired product N-(2,4,6-tribromophenyl)-4-bromobenzamide.

Additional benzamides which can be prepared by the procedures detailed in the foregoing examples and useful in the fire retardant compositions of this invention are N-(4-chlorophenyl)-3,4-dichlorobenzamide
N-(2,4-dichlorophenyl)-3,4-dichlorobenzamide
N-(2,6-dichlorophenyl)-3,4-dichlorobenzamide
N-(2,4,6-trichlorophenyl)-3,4-dichlorobenzamide
N-(2-bromophenyl)-3,4-dichlorobenzamide
N-(2,4-dibromophenyl)-3,4-dichlorobenzamide
N-(2,4,6-tribromophenyl)-3,4-dichlorobenzamide
N-(3-chlorophenyl)-2,3,6-trichlorobenzamide
N-(2,4-dichlorophenyl)-2,3,6-trichlorobenzamide
N-(2,5-dichlorophenyl)-2,3,6-trichlorobenzamide
N-(2,4,6-trichlorophenyl)-2,3,6-trichlorobenzamide N-(2,3,5,6-tetrachlorophenyl)-2,3,5-trichlorobenzamide
N-(3-bromophenyl)-2,3,5-trichlorobenzamide
N-(3,4-dibromophenyl)-2,3,5-trichlorobenzamide
N-(2,4,6-tribromophenyl)-2,3,5-trichlorobenzamide N-(2,4,6-trichlorophenyl)-3-bromobenzamide
N-(2,3,5,6-tetrachlorophenyl)-3-bromobenzamide
N-(3,4-dibromophenyl)-3-bromobenzamide
N-(2,4,6-tribromophenyl)-3-bromobenzamide
N-(3-chlorophenyl)-3,4-dibromobenzamide
N-(2,4-dichlorophenyl)-3,4-dibromobenzamide
N-(2,5-dichlorophenyl)-3,4-dibromobenzamide
N-(2,4,6-trichlorophenyl)-3,4-dibromobenzamide
N-(2,3,5,6-tetrachlorophenyl)-3,4-dibromobenzamide
N-(3-bromophenyl)-3,4-dibromobenzamide
N-(3,4-dibromophenyl)-3,4-dibromobenzamide
N-(2,4,6-tribromophenyl)-3,4-dibromobenzamide
N-(2,4,6-trichlorophenyl)-2,3,6-tribromobenzamide The benzamides of this invention impart fire retardant properties to combustible polymers by forming an intimate admixture therewith. This admixture can be readily prepared by one of several methods well known in the art. For example the benzamides can be admixed into the combustible polymer while the latter is dissolved in a suitable solvent. This procedure is especially useful when it is desired to mix the benzamide during the preparation of the polymer. The benzamide can also be mixed with the combustible polymer in the molten state at a temperature that can range from the melting point of the polymer to a temperature just below the decomposition temperature of the polymer. Another method of forming an intimate admixture comprises dry blending the benzamide with the polymer in the finely divided state. Subsequent molding or extrusion of this blend can then result in a substantially homogeneous composition.

The fire retardant polymeric compositions of the instant invention can contain a fire retarding amount of a benzamide of this invention. A fire retarding amount of the benzamide can range from about 5 to about 50 weight percent of the total composition. The exact amount of benzamide employed will depend upon such factors as the degree of fire retardancy desired, the specific combustible polymer used, the end use of the resulting product and the like.

The benzamides of this invention can impart fire retardant properties to a variety of combustible polymers. Exemplary of such polymers which can be used in admixture with the benzamides to form the fire retardant polymeric compositions of this invention are the homopolymers and copolymers of unsaturated aliphatic, cycloaliphatic, and aromatic hydrocarbons, such as polyethylene, polypropylene, polybutene, ethylene propylene copolymers, copolymers of ethylene or propylene with other olefins, polybutadiene, polymers of butadiene, polyisoprene, polystyrene, polyvinylidene, and polymers of pentene, hexene, heptene, octene, 2-methylpropene-1, 3-methylbutene-1, 4-methylpentene-1, 4-methylhexene-1, 5-methylhexene-1, bicyclohexene (2.2.1), pentadiene, hexadiene, 2,3-dimethylbutadiene-1,3, 2-methylpentadiene, vinylcyclohexene such as 4-vinylcyclohexene, cyclopentadiene, methylstyrene and the like. Other useful polymers include indenecoumarone resins, polymers of acrylate esters and polymers of methacrylate esters, acrylate and methacrylate resins such as ethyl acrylate, n-butyl methacrylate, isobutyl methacrylate, ethyl methacrylate, and methyl methacrylate, alkyd resins, hydrocarbon resins from petroleum, isobutylene resins, polyurethanes, polyester resins such as unsaturated polyesters of dibasic acids and dihydroxy compounds, polyester elastomers, saturated thermoplastic polyesters, polyisobutylene, rubbers such as natural rubber, synthetic polyisoprene, chlorinated rubber, polybutadiene, cyclized rubber, butadiene-acrylonitrile rubber, butadiene-styrene rubber, butyl rubber, neoprene rubber, terpene resins, urea resins, vinyl resins such as poly(vinyl acetal), poly(vinyl acetate), vinyl alcohol-acetate copolymer, poly(vinyl alcohol), poly(vinyl alkyl ether), vinyl methyl ether-maleic anhydride copolymer, poly(vinyl chloride), poly(vinyl butyral), vinyl chloride-acetate copolymer, poly(vinyl pyrrolidone), vinylidene chloride copolymers and the like. Additional useful polymers include nylon, diallyl phthalates and phthalate resins and polycarbonates.

The fire retardant compositions of this invention can also contain adjuvants which in conjunction with the benzamides of this invention improve the fire retardancy of the composition and in some instances provide synergistic results not obtainable with the use of the compounds alone. Such adjuvants can comprise antimony compounds such as antimony trioxide, zinc borate, lead arsenates such as $PbHAsO_4$ and the like. These adjuvants can comprise from about 1 to about 35 percent by weight of the total composition.

The effectiveness of the benzamides of this invention as flame retardants was demonstrated in an experiment wherein fire retardant compositions comprising the benzamide prepared in Example 2 and various combustible polymers were subjected to a flammability test using the oxygen index method. The flammability test was carried out in accordance with the general procedures detailed in the ASTM D 2863-70 test method. This method provides a procedure for determining the relative flammability of plastics by measuring the minimum concentration of oxygen expressed as volume percent, in a slowly rising mixture of oxygen and nitrogen that will just support combustion. The results of this experiment are set forth in the following examples. In each of these examples the components were blended in the molten state using a dough blender.

|  | Composition Parts by Weight | Oxygen Index Percent |
|---|---|---|
| Example 5 | | |
| Polypropylene | 100 | 24.5 |
| Product of Example 2 | 25 | |
| Example 6 | | |
| ABS* | 100 | 23.5 |
| Product of Example 2 | 20 | |
| Antimony trioxide | 5 | |
| Example 7 | | |
| ABS* | 100 | 21.5 |
| Product of Example 2 | 20 | |

*Terepolymer of acrylonitrile, butadiene and styrene.

We claim:

1. A fire retardant polymeric composition comprising a combustible polymer and a fire retarding amount of the compound

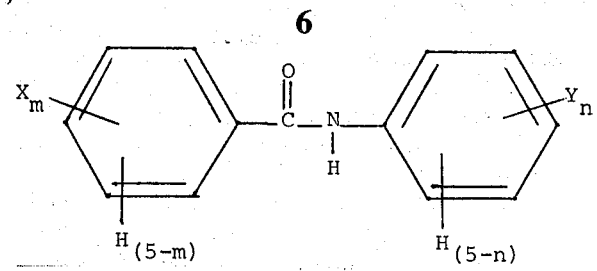

wherein X and Y are each selected from the group consisting of chlorine and bromine and $m$ and $n$ are each integers from 1 to 5.

2. The composition of claim 1 wherein the compound is N-(2,4,6-tribromophenyl)-2,5-dichlorobenzamide.

3. The composition of claim 1 wherein the combustible polymer is polystyrene.

4. The composition of claim 1 wherein the combustible polymer is polyethylene.

5. The composition of claim 1 wherein the combustible polymer is a terepolymer of acrylonitrile, butadiene and styrene.

6. The composition of claim 1 wherein the combustible polymer is polypropylene.

7. The composition of claim 1 wherein the combustible polymer is a polyester.

8. The composition of claim 1 which contains from about 1 to about 35 percent by weight of an adjuvant selected from the group consisting of antimony trioxide, zinc borate and lead arsenate.

* * * * *